United States Patent [19]

Elsenheimer et al.

[11] 4,369,059
[45] Jan. 18, 1983

[54] PROCESS OF DIRECTLY REDUCING IRON OXIDE CONTAINING MATERIALS IN A ROTARY KILN

[75] Inventors: Gerd Elsenheimer, Frankfurt am Main; Wolfram Schnabel, Hattersheim, both of Fed. Rep. of Germany

[73] Assignee: Metallgesellschaft Aktiengesellschaft, Frankfurt am Main, Fed. Rep. of Germany

[21] Appl. No.: 226,958

[22] Filed: Jan. 21, 1981

[30] Foreign Application Priority Data

Jan. 23, 1980 [DE] Fed. Rep. of Germany ....... 3002225

[51] Int. Cl.³ .............................................. C21B 13/08
[52] U.S. Cl. ........................................ 75/36; 266/173
[58] Field of Search ...................... 75/33, 36, 37, 38, 4; 266/175, 181, 173

[56] References Cited

U.S. PATENT DOCUMENTS

| | | | |
|---|---|---|---|
| 1,338,439 | 4/1920 | Greenwood | 75/37 X |
| 1,558,262 | 10/1925 | Greenwood | 75/33 |
| 2,089,782 | 8/1937 | Carlsson | 75/33 |
| 2,964,308 | 12/1960 | Walde | 75/1 R |

FOREIGN PATENT DOCUMENTS 2741216 8/1978 Fed. Rep. of Germany .......... 75/36

Primary Examiner—M. J. Andrews
Attorney, Agent, or Firm—Sprung, Horn, Kramer & Woods

[57] ABSTRACT

Before iron oxide-containing materials is reduced in a rotary kiln by a treatment with solid carbonaceous reducing agents below the melting point of the charge, the iron oxide containing material and carbonaceous reducing agent are preheated in a multiple-hearth furnace, in which the reducing agent is subjected to an at least partial coking or an at least partial low-temperature carbonization. To prevent a partial reduction and sintering, the iron oxide-containing material is preheated in the upper part of the multiple-hearth furnace and the solid carbonaceous reducing agent is separately preheated in the lower part of the multiple-hearth furnace. At least part of the gases produced by the low-temperature carbonization in the lower part of the multiple-furnace is caused to flow in the upper part of said furnace in a countercurrent to the iron oxide-containing material to supply the heat required in said upper part.

4 Claims, 1 Drawing Figure

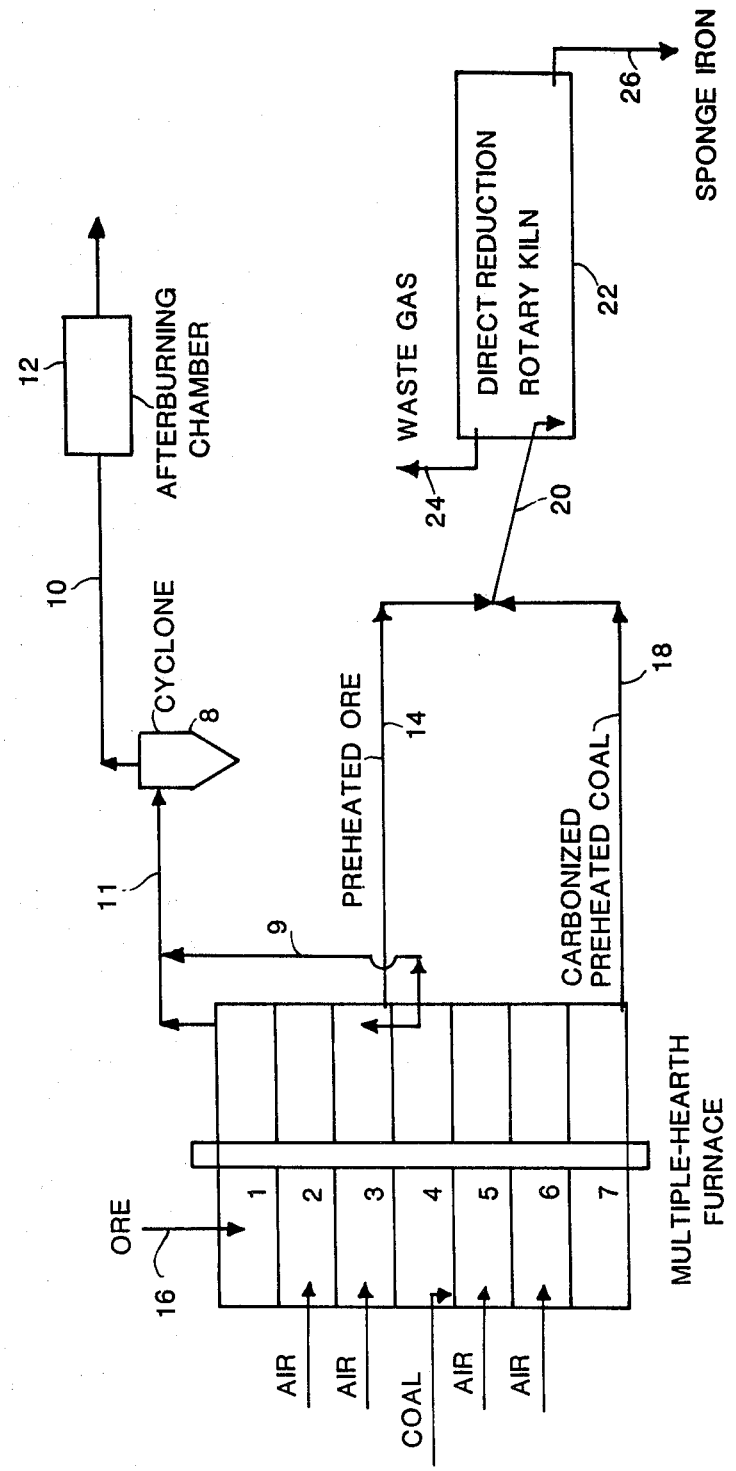

તાં4,369,059

PROCESS OF DIRECTLY REDUCING IRON OXIDE CONTAINING MATERIALS IN A ROTARY KILN

BACKGROUND OF THE INVENTION

1. Field of the Invention

This invention relates to a process of directly reducing iron oxide-containing materials by a treatment with solid carbonaceous reducing agent below the melting point of the charge in a rotary kiln, which comprises preheating the iron oxide-containing material and the carbonaceous reducing agent in a multiple-hearth furnace to at at least partial coking or an at least partial low-temperature carbonization.

2. Discussion of the Prior Art

The use of solid reducing agents, which contain a very high proportion of volatile constituents, such as lignites or brown coals, in a rotary kiln rise to an evolution of gas at a high rate. This gas rate will be increased further if moisture is contained in the reducing agent or in the iron oxide-containing material. The high gas rate results in a high velocity of flow of the furnace atmosphere. Because in a rotary kiln operated with countercurrent flow of the furnace atmosphere and the charge, the gas has the highest velocity at the charging end, the exhaust gas entrains fine-grained solids at a considerable rate, particularly if the charge contains fine-grained ores and a reducing agent having a relatively high proportion of fines. By these entrained solids, an afterburning of the combustible volatile constituents still contained in the exhaust gas is rendered more difficult. Such afterburning is necessary for economic reasons in case combustible volatile constituents become available at a rate which greatly exceed the rate required to supply the heat demand of the rotary kiln. Additionally, the rotary kiln is a relatively poor heat transfer system so that the heating-up zone is relatively long. This is true also where pellets or coarse ores are charged into the rotary kiln.

It is known from Offenlegungsschrift No. 2,741,216 to preheat a mixture of fine-grained iron ores and solid reducing agent in a multiple-hearth furnace to a temperature at which an at least partial coking or an at least partial combustion of the reducing agent is effected before the mixture is charged to the rotary kiln. In that multiple-hearth furnace, the required heat is supplied by the gases produced by low-temperature carbonization. That preheating step may result in local temperature rises above the permissible upper limit and in sintering. Additionally, it is not possible to use caking coals, and the ore is partly reduced so that crusts may be formed. If coarse ores or pellets are charged, their partial reduction results in their disintegration.

It is an object of the invention, therefore, to avoid said disadvantages and to provide a process which, in turn provides an economical preheating of iron oxide-containing materials with the aid of combustible volatile constituents of solid reducing agents.

SUMMARY OF THE INVENTION

This object is accomplished according to the invention in that the iron oxide-containing material is preheated in the upper part of the multiple-hearth furnace, the solid carbonaceous reducing agent is separately preheated in the lower part of the multiple-hearth furnace, and at least part of the gases produced by the low-temperature carbonization in the lower part are caused to flow in the upper part in a countercurrent to the iron oxide-containing material. The iron oxide-containing material is thus preheated to a temperature in the range of 600° to 900° C.

The iron oxide-containing material can be charged to the uppermost hearth of the upper part of the multiple-hearth furnace and travel from hearth to hearth as far as to the last hearth of the upper part and withdrawn thereform and then charged into the rotary kiln. The process can be used to special advantage for the processing of fine ores. It is also applicable to pellets or coarse ore. The term "fine ores" refers to ores of particle size below about 1 mm. "Coarse ore" is ore of particle size of about 1–30 mm. The pellets which can be processed by the process generally have a particle size of at least about 5 mm.

BRIEF DESCRIPTION OF DRAWING

Referring to the annexed drawing, the same is a flow diagram showing a process for carrying out the invention.

BRIEF DESCRIPTION OF SPECIFIC EMBODIMENTS

Referring to the annexed drawing, iron oxide containing ore is fed via conduit 16 into the uppermost (first) hearth chamber of a multiple hearth furnace containing, for example, seven hearth chambers. The same is heated therein at a temperature of about 800° C. by exhaust gases which become available by heating coal in chambers disposed therebelow. The ore is passed from the first hearth chamber to a second hearth chamber therebelow into which is introduced air. It is thereafter passed to a third hearth chamber disposed below the second hearth chamber to which another stream of air is introduced. The chamber is removed from the third hearth chamber.

Coal is introduced into the fourth hearth chamber, disposed below the third hearth chamber and therein heated. The coal is heated at a temperature of 700° C. as it passes from the fourth hearth chamber through the fifth and sixth hearth chambers therebelow to the seventh (lowermost) hearth chamber. Combustion air is introduced into the fifth and sixth hearth chambers.

A partial stream of the gas developing as a result of the low temperature carbonization in the fourth to the seventh hearth chambers is withdrawn from the multiple hearth furnace at the fourth hearth chamber and is passed to the third hearth chamber and is heated up therein by a partial combustion caused by the supply of combustion air. The partly burnt gases are then supplied to the second and first hearth chambers and completely burnt therein so that the ore is heated to a temperature of 800° C. The exhaust gas leaves the first hearth chamber at 600° C. and is mixed with the gas which has been withdrawn from the fourth hearth chamber of the multiple hearth furnace. The mixed gases are purified in cyclone 8, being introduced therein via conduits 9 and 11.

Off gases from cyclone 8 are withdrawn in conduit 10 and passed to an after-burning chamber 12 wherein they are burned.

The preheated ore withdrawn from hearth chamber 3 via line 14 is mixed with carbonized preheated coal withdrawn from the seventh hearth chamber via line 18. The combined preheated ore/carbonized preheated coal is passed via conduit 20 into a rotary kiln 22 for direct reduction of the iron ore. Waste gases are removed from the rotary kiln via conduit 24. The desired sponge iron product is removed from the rotary kiln via conduit 26.

The solid reducing agent can be fed to the uppermost hearth of the lower part of the multiple-hearth furnace and is withdrawn from the lowermost hearth of said lower part and then charged into the rotary kiln. The multiple hearth employed can be one wherein the hearths are positioned more or less one over the other so that the iron oxide can be passed generally downwardly from an upper hearth of the upper part of the multiple hearth furnace to hearths disposed therebelow (but above the uppermost hearth of the lower part). The solid carbonaceous reducing material is fed to the uppermost hearth of the lower part and similarly is passed to successively positioned lower hearths. This allows the gases provided, which can be of temperatures of 700° to 900° C. to rise to countercurrent flow against descending iron oxides in the hearths of the upper part.

The solid reducing agent may consist of any coal which has an adequate content of volatile constituents, inclusive of caking coal. Any agglomerates formed by caking coal may be disintegrated after they have left the multiple-hearth furnace. The gases required for the low-temperature carbonization of the reducing agent consist generally of air and are fed into the lower hearth chambers of the lower part of the multiple-hearth furnace and flow from hearth chamber to hearth chamber as far as to the uppermost hearth chamber of the lower part of the multiple-hearth furnace. The gas is preferably supplied in the form of partial streams into a plurality of hearth chambers. A small partial stream of the gas may be supplied into the lowermost hearth chamber. The rate at which hot gas produced by low-temperature carbonization e.g. carbonization at a temperature of 600° to 800° C., is fed from the uppermost hearth chamber of the lower part into the lowermost hearth chamber of the upper part of the multiple hearth furnace is selected so that the heat at the rate required to heat up the iron oxide-containing material is available in the upper part. If all gas produced by low-temperature carbonization is not required for that purpose, the remainder of said gas is withdrawn from the uppermost hearth chamber of the lower part of the multiple-hearth furnace and utilized for other purposes. In the upper part of the multiple-hearth furnace the hot gases produced by low-temperature carbonization flow also from hearth chamber to hearth chamber and are withdrawn from the uppermost hearth chamber.

In accordance with a preferred further feature, the gases produced by low-temperature carbonization and supplied to the upper part of the multiple-hearth furnace are subjected to at least partial interstage combustion before or as they enter the upper part of the multiple-hearth furnace. All or a partial stream of the gas produced by low-temperature carbonization may be burnt with the aid of added oxygen-containing gases consisting generally of air. This interstage combustion is effected in such a manner that the gas produced by low-temperature carbonization which is fed to the upper part of the multiple-hearth furnace cannot reduce the iron oxide-containing material. The interstage combustion may be effected in the uppermost hearth chamber of the lower part of the multiple-hearth furnace or in a chamber between the lower and upper parts. The interstage combustion results in a good reduction in the rotary kiln and ensures that a formation of crusts will be substantially avoided. Depending on the composition of the gas produced by low-temperature carbonization, the inter-stage combustion may alternatively be effected in the lowermost hearth chamber of the upper part of the multiple-hearth chamber.

According to a preferred further feature, at least a major part of the volatile combustible constituents of the gases produced by low-temperature carbonization is burnt before or as said gases enter the upper part of the multiple-hearth furnace. In that case, the gas that has been produced by low-temperature carbonization is supplied to the upper part of the multiple-hearth furnace at such a rate that the gas is at a temperature of about 1000° to 1100° C. after the interstage combustion. This produces particularly good results.

According to a further preferred feature, the exit temperature of the gas from the upper part of the multiple-hearth furnace is maintained above the ignition temperature of the gas and a combustion of residual combustible constituents is effected with a supply of air. This permits a complete utilization of the latent heat content of the exhaust gas without a supply of extraneous heat.

Generally speaking, the gases produced by low temperature carbonization or coking and employed for preheating are produced by heating the solid carbonaceous reducing agent at a temperature of 600° to 800° C., in the presence of an oxygen containing gas, preferably air.

EXAMPLE

An experimental hearth furnace was provided having the following dimensions:
Height: 2.06 m
Outside diameter: 1.59 m
Inside diameter: 1.18 m
Number of hearths: 7
Active hearth area: 5.8 m²
Gas withdrawal from hearth chambers: 1, 3 and 5
Additional heat supply (if required) to hearth chambers: 2 and 4

The ore which was used had the following composition:

$Fe_{total}$: 66.2%
$Fe^{++}$: 0.7%
$SiO_2$: 3.8%
$H_2O$: 5%

The sieve analysis of the ore was as follows:

Above 1 mm: 3.9%
0.5 to 1 mm: 18.2%
0.3 to 0.5 mm: 21.6%
0.2 to 0.3 mm: 24.7%
0.1 to 0.2 mm: 20.9%
below 0.1 mm: 10.7%

The coal which was used had the following analysis:

Moisture: 20%
Fixed carbon: 49.4%
Volatile matter: 36.5%
Ash: 14.1%
Sulfur: 0.76%

The coal had the following sieve analysis:

Above 20 mm: 11.7%
15 to 20 mm: 33.8%
10 to 15 mm: 40.2%
6 to 10 mm: 12.9%
below 6 mm: 1.4%

340 kg ore are charged to the uppermost (first) hearth chamber of the furnace and are withdrawn from the third hearth chamber at a temperature of 800° C. 230 kg coal are charged to the fourth hearth chamber and are withdrawn from the seventh hearth chamber at a temperature of 700° C. Both streams of withdrawn solids are mixed and charged to a rotary kiln.

Combustion air is supplied to the second, third, fifth and sixth hearth chambers. A partial stream of the gas produced by the low-temperature carbonization in the fourth to seventh hearth chambers is withdrawn from the multiple-hearth furnace at the fourth hearth chamber and has the following approximate analysis:

$CO_2$: 12.4%
$O_2$: 0.5%
CO: 6.1%
$CH_4$: 1.6%
$H_2$: 5.7%
$N_2$: 56.3%
$H_2O$: 17.8%

The gas has a temperature of 500° C.

Another partial stream of the gas is passed to the third hearth chamber and is heated up therein by a partial combustion caused by a supply of combustion air. The partly burnt gases are then supplied to the second and first hearth chambers and completely burnt therein, so that the ore is heated to a temperature of 800° C. The exhaust gas leaves the first hearth chamber at 600° C. and is mixed with the gas which has been withdrawn from the fourth hearth chamber of the multiple-hearth furnace. The mixed gases are purifed in cyclones and are completely burnt in an afterburning chamber.

The advantages afforded by the invention reside in that fine-grained iron oxide-containing materials such as spiral concentrator products, ilmenites, iron sands or similar materials can be processed without a formation of crusts, that coarse ores or pellets can be preheated without substantial disintegration, and that solid reducing agents having any desired, high content of volatile constituents, as well as caking coals can be used for preheating with high economy.

What is claimed is:

1. In a process of directly reducing iron oxide-containing materials by a treatment with solid carbonaceous reducing agent below the melting point of the charge in a rotary kiln, which comprises preheating the iron oxide-containing material and the carbonaceous reducing agent in a multiple-hearth furnace before they are charged to the rotary kiln and subjecting the reducing agent in the multiple-hearth furnace to an at least partial coking or an at least partial low-temperature carbonization, characterized in that the iron oxide-containing material is preheated in the upper part of the multiple-hearth furnace under substantially non-reducing conditions, the solid carbonaceous reducing agent is separately preheated in the lower part of the multiple-hearth furnace, and at least part of the gases produced by the low-temperature carbonization in the lower part are caused to flow in the upper part in a countercurrent to the iron oxide-containing material.

2. A process according to claim 1, wherein gases are produced by low-temperature carbonization, are supplied to the upper part of the multiple-hearth furnace and are subjected to at least partial interstage combustion before or as they enter the upper part of the multiple-hearth furnace.

3. A process according to claim 2, wherein at least a major part of the volatile combustible constituents of the gases produced by low-temperature carbonization is burnt before or as said gases enter the upper part of the multiple-hearth furnace.

4. A process according to claim 1, wherein the exit temperature of the gas from the upper part of the multiple-hearth furnace is maintained above the ignition temperature of the gas and a combustion of residual combustible constituents is effected with a supply of air.

* * * * *